United States Patent [19]
Fong

[11] Patent Number: 5,992,299
[45] Date of Patent: Nov. 30, 1999

[54] COFFEE MAKERS

[75] Inventor: Yau Fong, Kowloon, The Hong Kong Special Administrative Region of the People's Republic of China

[73] Assignee: Silver Plan Industrial Limited, The Hong Kong Special Administrative Region of the People's Republic of China

[21] Appl. No.: 09/082,928

[22] Filed: May 21, 1998

[51] Int. Cl.[6] .................................................. A47J 31/42
[52] U.S. Cl. ............................... 99/286; 99/287; 99/290; 99/304
[58] Field of Search .............................. 99/286, 287, 304, 99/305, 306, 289 R, 290

[56] References Cited

U.S. PATENT DOCUMENTS

| | | | |
|---|---|---|---|
| 4,196,658 | 4/1980 | Takagi et al. | 99/286 |
| 4,406,217 | 9/1983 | Oota | 99/286 X |
| 4,962,693 | 10/1990 | Miwa et al. | 99/287 X |
| 4,983,412 | 1/1991 | Hauslein | 99/287 X |
| 5,083,502 | 1/1992 | Enomoto | 99/286 |

*Primary Examiner*—Reginald L. Alexander
*Attorney, Agent, or Firm*—Jackson Walker L.L.P.

[57] ABSTRACT

A combined coffee grinder and filter coffee maker has a filter compartment comprising a perforated container. A releasable cup surrounds the compartment and fit to a housing in use. A motor is provided to drive blades to grind the coffee and the coffee is then made with the compartment in situ.

3 Claims, 2 Drawing Sheets

5,992,299

COFFEE MAKERS

BACKGROUND OF THE INVENTION

1. Field of the Invention

The invention relates to coffee makers.

2. Description of Prior Art

The invention relates more particularly to a combined coffee grinder and coffee maker. It is well-known to make coffee in a coffee maker that comprises a reservoir, an electric water heater that is arranged to heat the water supplied from the reservoir and pass the hot water into a filter compartment. A coffee pot or vessel is provided under the filter compartment to collect coffee that is made by passing the hot water through coffee grounds supported by a filter in the bottom of the filter compartment. It is also known to have a keep-warm function that retains the coffee warm in the coffee pot as required until the coffee pot is removed to pour coffee into cups for drinking. Electrically operated coffee grinders are also known in which a blade or set of blades is rotated at high speed to grind coffee beans into suitably sized coffee grounds for use in a filter compartment. At present, the coffee makers and coffee grinders are provided as quite separate domestic appliances.

SUMMARY OF THE INVENTION

It is an object of the invention to provide a combined appliance capable of grinding coffee beans and making coffee.

According to the invention there is provided a combined coffee grinder and filter coffee maker in which a filter compartment comprises an open-topped container having a perforated base, rotatable grinding blades mounted for rotation about a central axis of the container and a drive shaft connected to rotate the blades having an upper drive coupling, including an electric motor arranged to mechanically engage the drive coupling such that a batch of coffee beans placed in the container can be ground and coffee then made by supplying hot water into the top of the container to flow over the ground coffee.

A timing controller for the motor may be included in which the time of grinding operation can be set so as to automatically control the courseness of the coffee grounds produced by the coffee grinder.

The open-topped container may be supported by a cup arranged to releasably fit to a housing of the combined coffee grinder and filter coffee maker.

A removable plastics mesh may be provided inside the base of the cup.

The filter compartment may be releasably mounted in use below a coffee bean storage compartment incorporated in the housing and having a dispensing outlet positioned to dispense coffee beans into the filter compartment before it is fitted to the housing for grinding of the coffee beans.

BRIEF DESCRIPTION OF THE DRAWINGS

A combined coffee grinder and filter coffee maker according to the invention will now be described by way of example with reference to the accompanying drawings in which.

DESCRIPTION OF THE PREFERRED EMBODIMENTS

Figure 1:
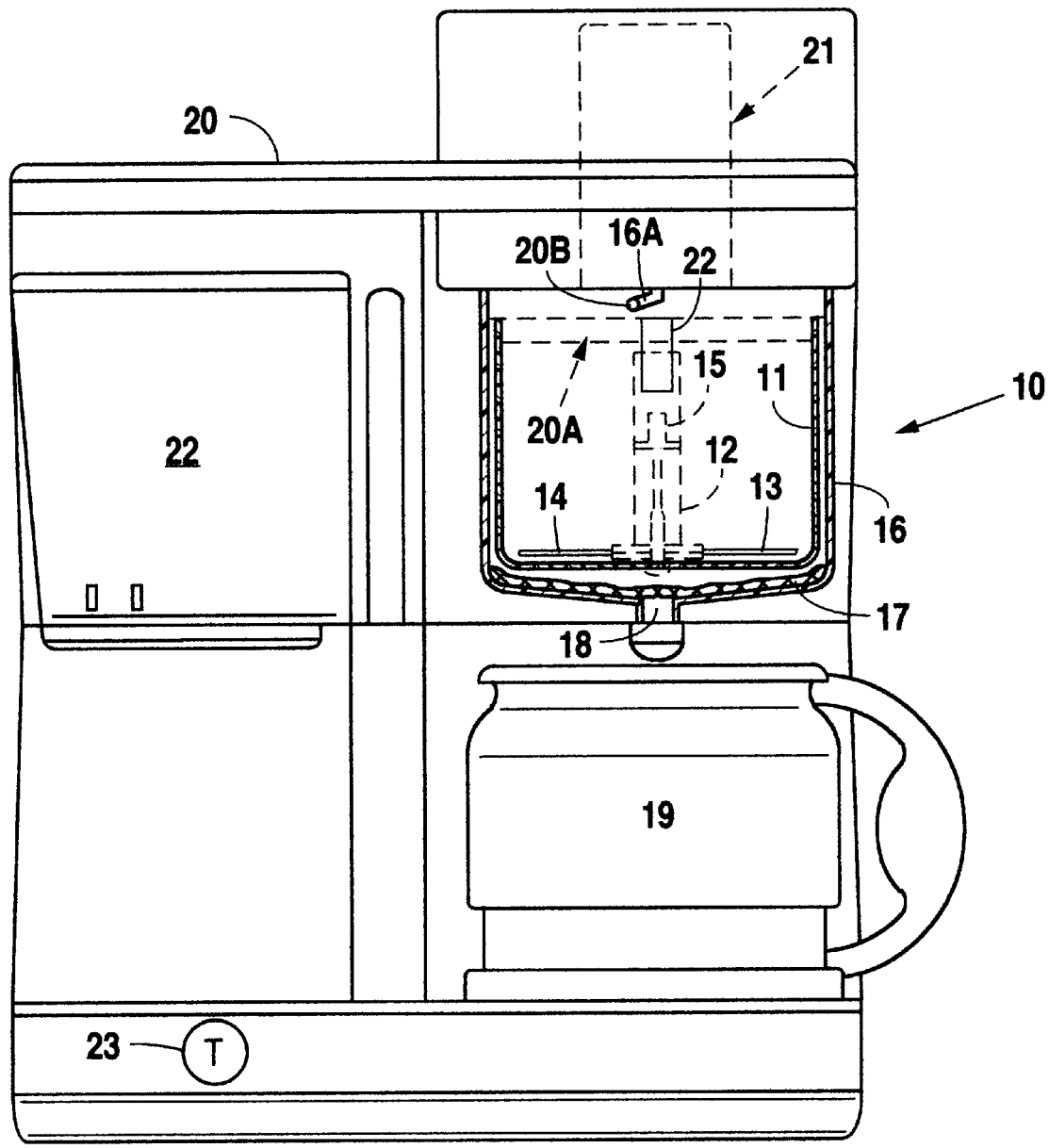
FIG. 1 shows a part-sectioned elevation of the coffee maker.
Figure 2:
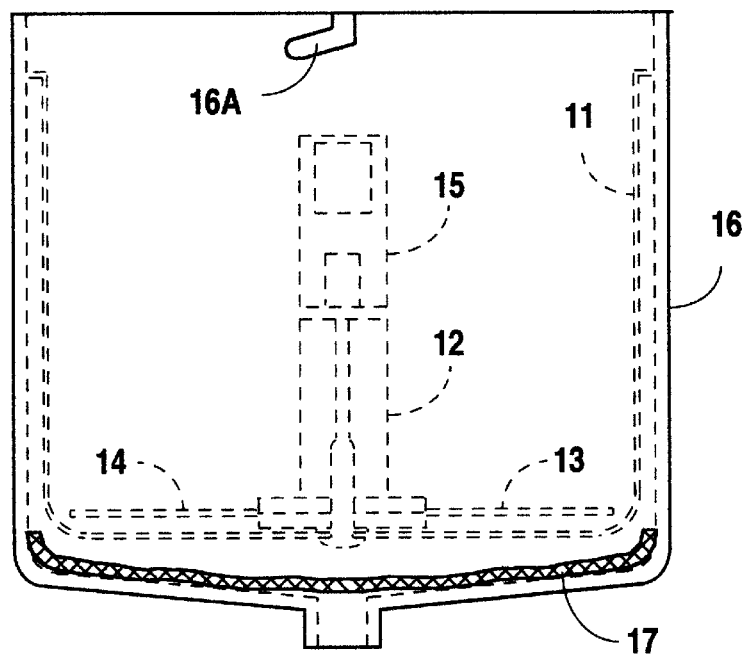
FIG. 2 shows a filter compartment for the coffee maker.
Figure 3:
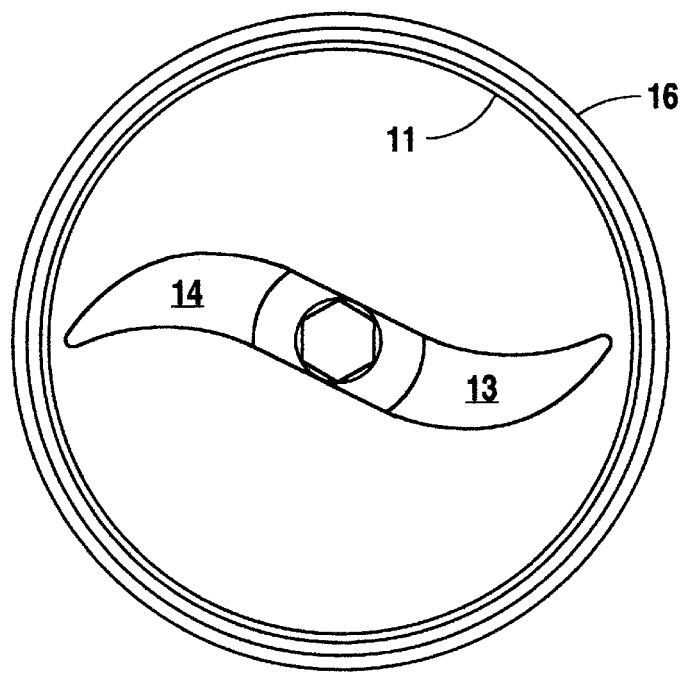
FIG. 3 is a top plan view of the filter compartment.

Referring to the drawings, in FIG. 1 a coffee grinder 10 comprises an open-topped perforated metallic container 11 in which a shaft 12 is mounted to rotate about a central vertical axis of the container. The shaft carries two blades 13 and 14 adjacent its lower end and has a drive coupling 15 at its upper end. The container 11 is supported at its top periphery by push-fitting to a shaped rim 16A formed in a plastic molded housing 20. A plastics cup 16 surrounds the container 11 and is provided with a removable plastics mesh filter mat 17 in its base. An angled slot 16A formed in a well at the top of the cup provides a bayonet-type connection to a stud 20B formed on the housing 20. An outlet 18 allows coffee to drain into a coffee pot 19. The housing 20 incorporates an electric drive motor 21 that is mounted above the container 11 so that its drive shaft 22 can be mechanically coupled to the shaft 12.

In use, the container 11 is partially filled from a coffee bean dispenser 22, that is also incorporated in the housing 20, and then placed in position under the motor 21 and the cup 16 fitted to the housing 20. The motor is then turned on for a chosen time period, preferably under the control of a settable automatic timer (not shown), to grind the coffee beans into coffee grounds of chosen coarseness. The coffee machine is then turned on so that hot water is supplied into the top of the container 11 to pass over the freshly prepared coffee grounds and through the base of the container 11 and out the outlet 18 of the holder 16 into the coffee pot 19.

Broadly stated, the coffee maker as such is of a well-known design and the coffee grinder is in a form that is itself also quite conventional. However, it has not previously been proposed to use a coffee grinder, having a suitably perforated container, that remains in situ during a coffee making cycle as a component of the coffee making machine itself. The described combined coffee grinder and coffee maker actually requires less components that a separately provided grinder and coffee maker, but more importantly offers a "combined" appliance that takes up less overall space and is no more difficult to operate and to maintain. In this respect, the coffee grinder parts are easily removable for use and for cleaning.

The container 11 may be arranged with perforations only at its base that extend, if at all, only a short distance above the level of the base. The container may also be arranged to be supported by the cup 16, instead of directly by the housing 20 during use. It will be appreciated that couplings, other than the described bayonet-type coupling, may be provided for releasably attaching the cup 16 to the housing 20.

As the described combination of components uses well-known techniques to grind and to make coffee, it is believed that the individual parts of those components require no further explanation as they are, as individual or separate appliances, already generally well understood by persons skilled in the art. A conventional timer 23 is fitted to a base of the housing 20.

I claim:

1. A combined coffee grinder and filter coffee maker having a filter compartment comprising:

a housing;

an open-topped container having a perforated base, said open-topped container supported by a cup arranged to releasably fit to said housing;

rotatable grinding blades mounted for rotation about a central axis of said container;

a drive shaft connected to rotate said blades having an upper drive coupling;

an electric motor arranged to mechanically engage said drive coupling such that a batch of coffee beans placed in said container may be ground and coffee then made by supplying hot water into said top of said container to flow over said ground coffee; and a removable mesh inside said base of said cup.

2. A combined coffee grinder and filter coffee maker according to claim 1, further comprising: a timing controller for said motor in which the time of grinding operation may be set so as to automatically control the courseness of said coffee grounds produced by said coffee grinder.

3. A combined coffee grinder and filter coffee maker according to claim 1 further comprising a second housing to which said filter compartment is releasably mounted in use below a coffee bean storage compartment incorporated in said housing and having a dispensing outlet positioned to dispense coffee beans into said filter compartment before it is fitted to said housing for grinding of said coffee beans.

* * * * *